United States Patent [19]

Ghaem-Maghami et al.

[11] Patent Number: 4,525,745
[45] Date of Patent: Jun. 25, 1985

[54] TEMPERATURE COMPENSATION FOR TV PROJECTION LENS AND CRT ASSEMBLY

[75] Inventors: Sanjar Ghaem-Maghami; Raymond G. Ehlers, both of Chesapeake, Va.

[73] Assignee: General Electric Company, Portsmouth, Va.

[21] Appl. No.: 435,838

[22] Filed: Oct. 22, 1982

[51] Int. Cl.³ .......................... H04N 5/74; G02B 7/02
[52] U.S. Cl. ..................................... 358/237; 358/64; 350/253; 352/140; 353/101; 355/44
[58] Field of Search ................. 358/237, 239, 250, 64; 350/521, 533, 253; 352/140; 353/69, 101; 354/408; 355/30, 44

[56] References Cited

U.S. PATENT DOCUMENTS

| | | | |
|---|---|---|---|
| 1,325,936 | 12/1919 | Fouasse | |
| 2,533,478 | 12/1950 | Lee | |
| 2,537,900 | 1/1951 | Lee | |
| 3,205,774 | 9/1965 | Estes | 350/253 |
| 3,447,875 | 6/1969 | Goldberg | 359/253 |
| 3,612,664 | 10/1971 | Berman | 350/253 |
| 3,671,108 | 6/1972 | Kilgus | 350/253 |
| 3,904,276 | 9/1975 | Whitaker | 350/253 |
| 4,162,120 | 7/1979 | Moreno | 350/253 |
| 4,165,918 | 8/1979 | Moreno | 350/253 |
| 4,190,325 | 2/1980 | Moreno | 350/253 |
| 4,234,894 | 11/1980 | Tokumaru | 358/250 |
| 4,300,817 | 11/1981 | Betensky | 350/412 |

FOREIGN PATENT DOCUMENTS 19757  2/1979  Japan ................... 350/253

Primary Examiner—Tommy P. Chin

[57] ABSTRACT

Projection TV systems comprise plactic lens and CRT assemblies arranged to project an image onto a screen for viewing. The focus of the lens varies with ambient temperature around the lens as the temperature increases from turn-on of the projection TV system to a warmed-up condition of the system. There is disclosed a temperature compensating mechanism for the lens. The mechanism may be incorporated into the lens to cause direct axial movement of a lens element or it may be attached to an external focussing adjustment of the lens. Several embodiments of the mechanism are disclosed employing either a bimetal or a piston slidable in a cylinder with the cylinder being filled with a material that expands with temperature. The piston and cylinder assembly is used in the preferred embodiment with the cylinder housing attached to the lens housing and the piston directly connected to the external focussing adjustment of the lens.

10 Claims, 11 Drawing Figures

TEMPERATURE COMPENSATION FOR TV PROJECTION LENS AND CRT ASSEMBLY

BACKGROUND OF THE INVENTION

The subject invention compensates for the degradation of picture quality due to focus and convergence changes as a result of temperature variation around TV projection lens and cathode ray tube (CRT) assemblies.

In a projection TV, there is a projection lens which focuses the image from a small CRT onto a large screen. A typical configuration is shown in FIG. 1 and comprises a small CRT 10, a projection lens 11, mirrors 12 and 13, a projection screen 14 all housed in a common cabinet 15. In practice, there are separate lens and CRT assemblies for each of the colors red, blue and green, and each of the assemblies project an image onto the common projection screen. The projection lens shown in FIG. 1 is illustrated in more detail in the cross-sectional view of FIG. 2. This lens is composed of a plano-concave lens 20, a condensing lens 21, a mirror 22, and a plano-convex objective lens 23. The planar surface of lens 20 is optically coupled to the face plate of the CRT. The optics of the lens 11 are mounted within a unitary molded plastic housing 24, and the lens elements 20, 21 and 23 are also made of plastic. In order to focus the lens and CRT assembly, the lens elements 20 and 21 are mounted in a rotatable barrel mount 25 within the housing 24. The mount 25, like the housing 24, is molded plastic. There is a molded internal spiral groove in housing 24 into which fits a projection 26 on the outer peripheral surface of mount 25. The projection 26 is drilled and tapped to receive a wingnut assembly 27 which extends through a slot in housing 24. FIG. 3 is a top view of the lens 11 showing the objective lens 23 in housing 24 and the wingnut assembly 27 extending out of the housing 24. The diagonal bias of the slot which follows the internal spiral groove is clearly visible in FIG. 3. Focussing the lens involves loosening the wingnut assembly 27 and sliding it in one direction or the other in the slot in housing 24 and then retightening the wingnut assembly when focus has been achieved. By sliding the wingnut assembly in the slot, the mount 25 is rotated and, as a consequence of which due to the projection 26 in the spiral groove, is also translated along the axis of lens elements 20 and 21. In an alternative embodiment, the lens element 20 is fixed in housing 24, and only lens element 21 moves with the mount 25 in the focussing operation.

The projection TV shown in FIG. 1 is known as a rear projection TV, but the principles of operation are the same as for a front reflecting projection TV. Moreover, the lens 11 shown in FIGS. 2 and 3 may be used in either type of projection TV system, but while a folded lens is shown, the principles of operation are equally applicable to non-folded lenses which are also commonly used in projection TV systems. A manufacturer of projection lenses of the type described in U.S. Precision Lens, Inc. of Cincinnati, Ohio.

As may be seen in FIG. 1, the distance between the objective lens element 23 of the lens and CRT assembly 10, 11 and the projection screen 14 is fixed. The focus of each of the red, blue and green lens and CRT assemblies is set at the factory by the procedure of loosening, sliding and retightening the wingnut assemblies as described above. A problem arises during warm-up of the TV set when the ambient temperature around the lens changes, thereby causing the focus to drift. We have determined by empirical tests that, for the projection lens described, a temperature rise of 10° C. will change the focus position approximately 1.0". In the past, this change in focus has been accomodated in the factory focus adjustment by setting the lens to be focussed at a median ambient temperature between a cold condition and a warmed-up condition after the TV set has been on for a period of time. In doing so, the depth of field of the projection lens is relied on to provide a reasonably focussed picture throughout the operating temperature. This is not entirely satisfactory where critical focus is desired, and the problem is further aggravated by the fact that there are generally three CRTs in the projection TV set and the ambient temperature within the cabinet is not everywhere the same.

SUMMARY OF THE INVENTION

It is therefore an object of the present invention to provide an inexpensive, compact temperature compensating mechanism for TV projection lens and CRT assemblies.

It is another object of the invention to provide a temperature responsive focus adjusting mechanism for a lens used in a projection TV set.

It is a further object of this invention to provide separate temperature compensation for the focus of each of the red, blue and green lens and CRT assemblies in a color projection TV set thereby optimizing system focus adjustment.

Briefly stated, the foregoing and other objects are attained by a device which moves approximately linear with increasing temperature in the temperature range of interest. The device may be incorporated into the lens 11 to provide direct axial movement of lens element 21 or lens elements 20 and 21 together. The device may be attached to the lens housing 24 to provide movement of the projection 26 within the internal spiral groove of the housing thereby making use of the normal focus adjusting mechanism of the lens. Further, the device may be attached to the interior of the TV cabinet to move the entire lens and CRT assembly. For the example of the lens illustrated in FIGS. 2 and 3, the required movement of the device when providing direct axial movement of a lens element or elements is on the order of 0.3 mm per 10° C. When moving the normal focus adjusting mechanism, the required movement of the device is on the order of 1 mm per 10° C., and when moving the entire lens and CRT assembly, the required movement of the device is on the order of 0.5 mm per 10° C. For the example given, each of these movements will shift the focus about 1.0" per 10° C. Obviously, these figures are to be taken as exemplary since other lenses and other projection systems will exhibit different characteristics.

The device itself may be a bimetal or a piston driven by an expanding fluid or solid. The preferred embodiment and best mode for the practice of the invention has been found to be a piston in a cylinder containing polyethylene glycol and attached directly to the focus adjustment of the lens. Again for the example given, a motion of about 2 mm is considered sufficient to handle conditions that exist in most houses.

BRIEF DESCRIPTION OF THE DRAWINGS

The specific nature of the invention, as well as other objects, aspects, uses and advantages thereof, will clearly appear from the following description and from the accompanying drawings, in which.

DETAILED DESCRIPTION OF THE INVENTION

Figure 1:
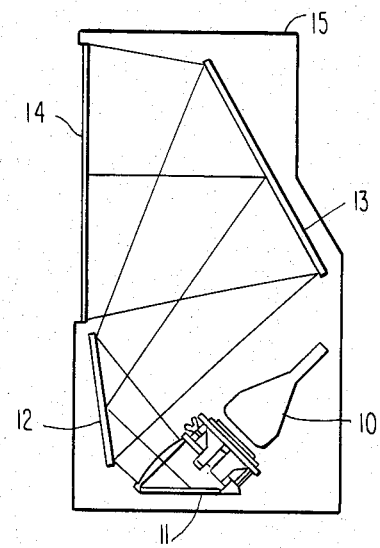
FIG. 1 is a simplified cross-sectional view of a typical rear projection TV.
Figure 4:
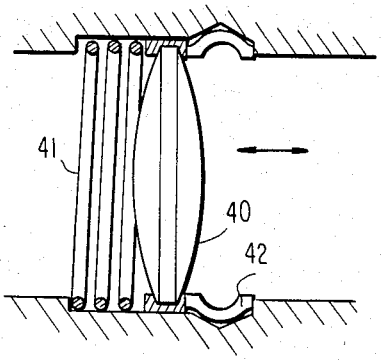
FIG. 4 is a schematic view of a first embodiment of the invention using a bimetal ring.
Figure 5:
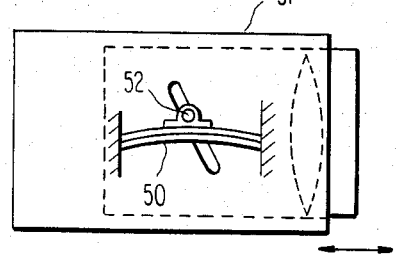
FIG. 5 is a schematic view of a second embodiment of the invention using a bimetal leaf.

As has been alluded to, there are several mechanisms which can be used in the practice of the invention for moving the lens assembly or lens elements. FIG. 4 schematically illustrates a lens element 40 biased by spring 41 and abutting a bimetal ring 42. The bimetal ring 42 expands with temperature and axially moves the lens element 40 against the bias of spring 41. As shown in FIG. 5, a bimetal 50 can be anchored to the lens housing 51 and connected at 52 to the focus adjustment of the lens. As the bimetal 50 bends with temperature, the focus will move. A bimetal can also be placed under the lens mount to move the entire lens assembly.

Figure 6A:
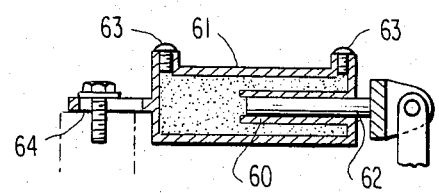
FIGS. 6A and 6B are a cross-sectional view and a top view, respectively, a piston and cylinder assembly used in a preferred embodiment of the invention.
Figure 6B:
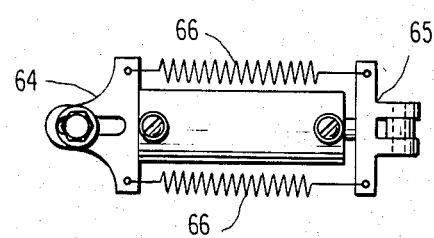
Figure 2:
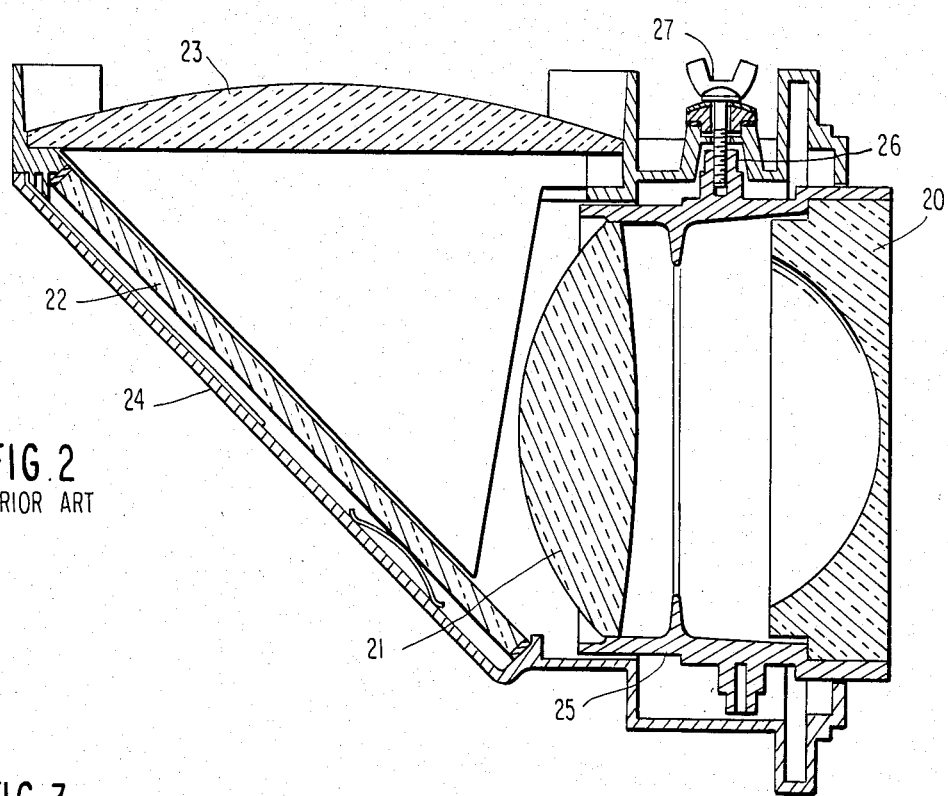
FIG. 2 is a cross-sectional view of the lens used in the projection TV system of FIG. 1.
Figure 3:
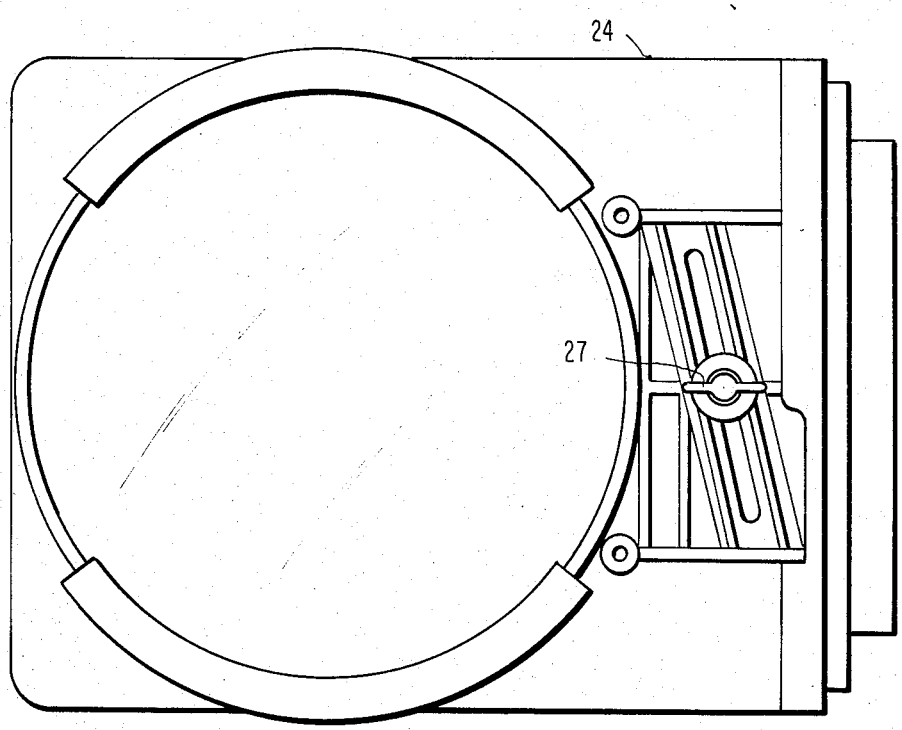
FIG. 3 is a top view of the lens of FIG. 2.

A piston in a cylinder containing a material that expands with increasing temperature is, however, the preferred device for effecting focus adjustment in a projection TV according to the invention. An example of the piston and cylinder is shown in FIGS. 6A and 6B. As shown in cross-section in FIG. 6A the cylinder 60 is integral with a housing 61 which serves as a reservoir for a suitably selected thermally expanding material. The piston 62, in the form of a rod, slideably fits into cylinder 60. The housing 61 has one or more closeable or sealable ports 63 for filing with the thermally expandable material. The housing 61 is further provided with a mounting lug 64 for mounting the piston and cylinder assembly. As seen in the top view of FIG. 6B, a connecting member 65 is attached to the end of the piston 62 which projects out of the cylinder 60. Springs 66 are attached between the mounting lug 64 and the connecting member 65 to bias the piston toward its refracted position. Such springs could be dispensed with if, for example, the focus mechanism of the lens were biased against the movement of the piston 62.

As may be seen, connecting member 65 is pivotally connected to a lever arm whose movement affects the focus of a lens assembly. The mounting lug 64 is provided with a slot through which a screw extends. The screw secures the mounting lug to a member that is stationary with respect to the focussing mechanism. During assembly of the system, and preferably with the cylinder 60 at an equilibrium temperature, the cylinder 60 may be moved slightly by the limits of the slot in mounting lug 64 to a position which provides proper initial focus. Then the screw in the slot of the mounting lug 64 is tightened to fix the position of the cylinder 60. This adjustment corresponds to the initial factory adjustment previously described. With the cylinder 60 now fixed in position, movement of the lever arm attached to the connecting member 65 will be subject to temperature changes experienced by the temperature sensitive material.

Figure 7:
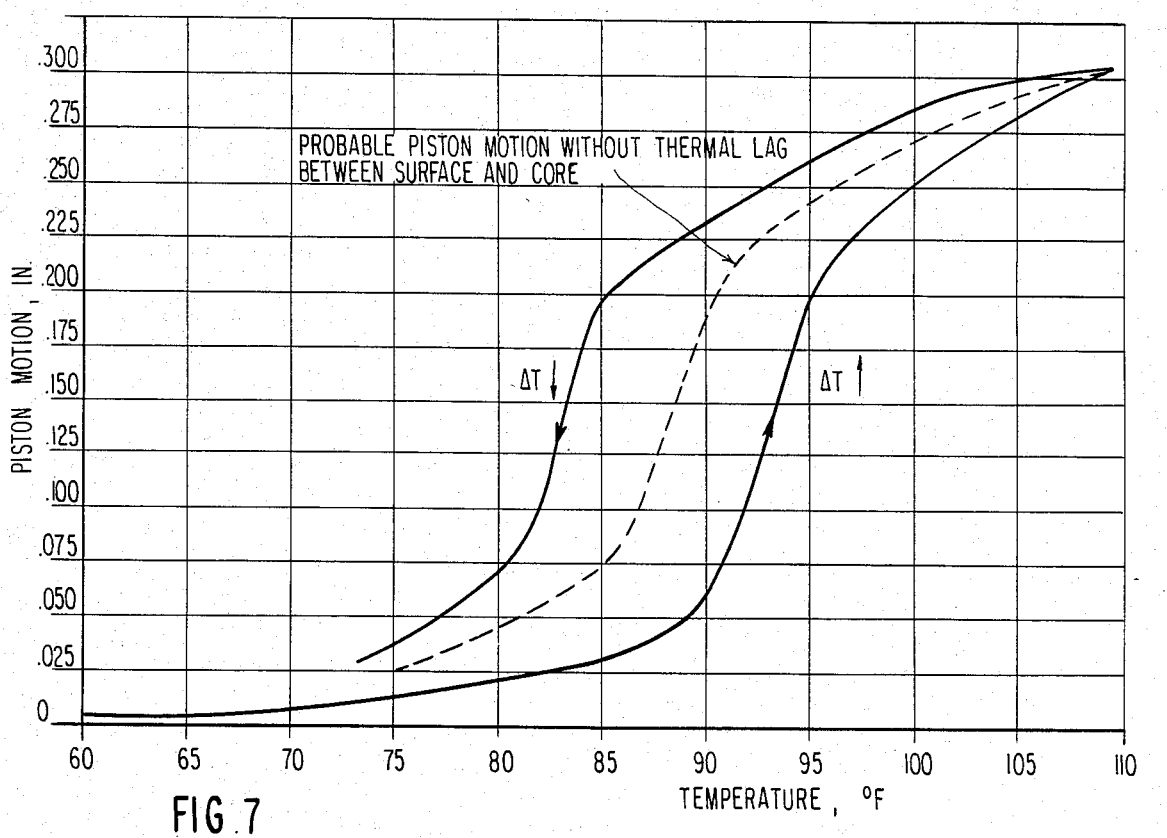
FIG. 7 is a graph of the motion of the piston of the assembly shown in FIGS. 6A and 6B as a function of temperature.

FIG. 7 is a graphical plot of the piston motion as a function of temperature where the thermally expanding material in the housing 61 is a polyethylene glycol, commonly known as Carbowax. It will be observed that the motion is described by a hysteresis curve, but it is only that part of the curve related to increasing temperature which is of interest. Although the curve is nonlinear, it is linear throughout substantially the temperature range of interest. The curve shown in FIG. 7 was developed from data taken from a prototype and, while not an exact match of the motion desired, it is close to the desired motion. A refinement of cylinder size would fine tune the device to provide precisely the motion desired.

Figure 8:
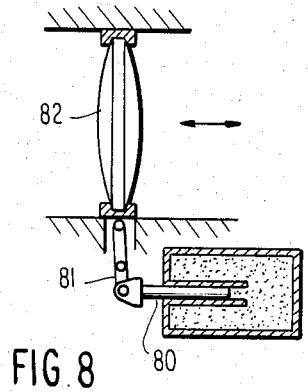
FIG. 8 is a schematic view of one alternative embodiment of the invention using the piston and cylinder assembly.
Figure 9:
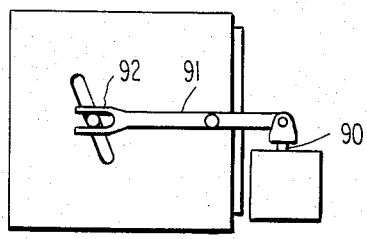
FIG. 9 is a schematic view of another alternative embodiment of the invention using the piston and cylinder assembly.
Figure 10:
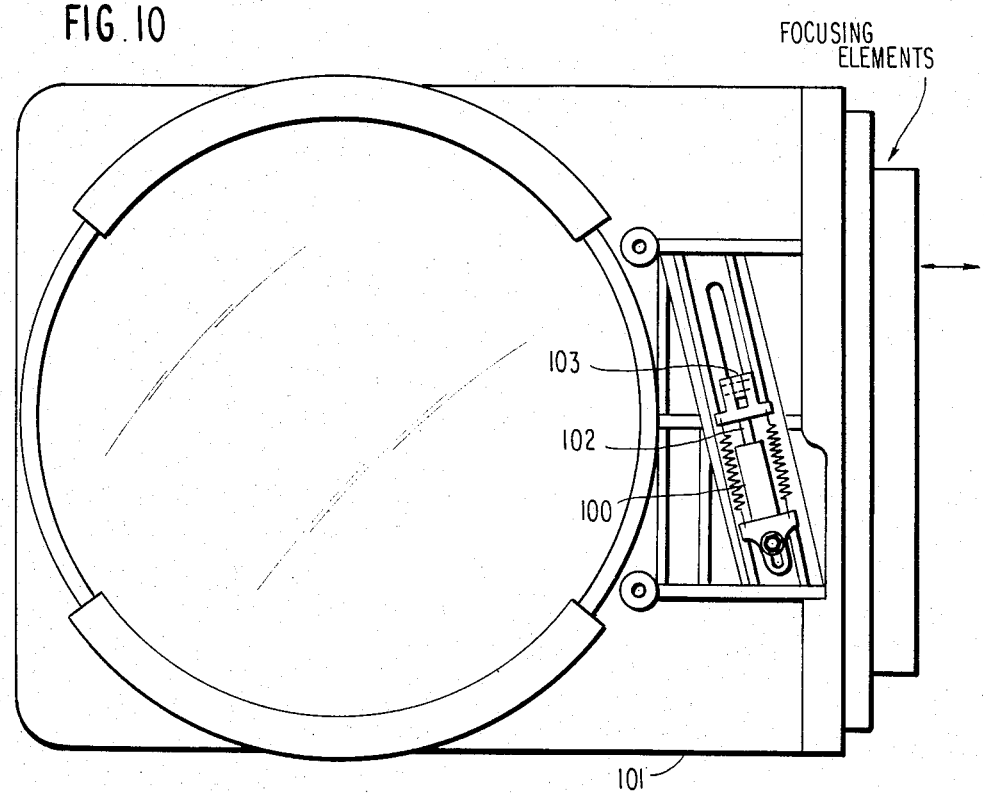
FIG. 10 is a top view showing the preferred embodiment of the invention using the piston and cylinder assembly.

The piston and cylinder of FIGS. 6A and 6B can be used to adjust the axial position of the single lens element as shown in FIG. 8. In this figure, the piston 80 pushes on lever arm 81 which, in turn, moves the lens element 82. Alternatively, the piston and cylinder can be used to move the focus adjustment of the lens assembly. One approach is shown in FIG. 9 wherein the piston 90 pushes on lever 91. The opposite end of lever 91 is provided with a yoke that engages the focus adjustment 92. The preferred approach, however, is shown in FIG. 10. In this figure, the cylinder housing 100 is secured to the lens assembly housing 101. The piston 102 extending from the cylinder is attached directly to the focus adjustment 103. This approach has the advantage of requiring the least modification to the commercially available lens assembly.

As with the bimetal, the piston and cylinder could also be used to move the entire lens assembly.

A particular advantage of the invention is that since each of the three lens and CRT assemblies is exposed to different temperatures causing different amounts of drift, the individual compensation device for each assembly provides the right amount of adjustment to keep the total system optimized.

We claim:

1. In a projection TV system of the type comprising at least one lens and CRT assembly arranged to project an image onto a screen for viewing, the focus of said lens varying with ambient temperature around the lens as the temperature increases from turn-on of the projection TV system to a warmed-up state of said system, the improvement comprising means connected to said lens and CRT assembly for automatically adjusting the focus of said image on the screen as a function of said ambient temperature.

2. In a projection TV system of the type comprising at least one lens and CRT assembly arranged to project an image onto a screen for viewing, said lens having a plurality of elements at least one of which is movable in order to focus the image on the screen, the focus of said lens varying with ambient temperature around the lens as the temperature increases from turn-on of the projection TV system to a warmed-up condition of said system, the improvement comprising means connected to said at least one movable lens element for effecting movement of the element and thereby automatically adjusting the focus of said image on the screen as a function of said ambient temperature.

3. A projection TV system as recited in claim 2 wherein said system comprises three lens and CRT assemblies for separately projecting red, blue and green images on said screen, separate means being provided for each of said lens and CRT assemblies for individually adjusting the focus of said images on the screen as a function of said ambient temperature.

4. A projection TV system as recited in claim 2 wherein said at least one movable lens element is axially movable and said means for adjusting the focus comprises a bimetal ring abutting the peripheral edge of said movable lens element on one side thereof and a spring abutting the peripheral edge of said movable lens element on the other side thereof, said bimetal ring expanding with temperature to axially move said movable lens element against the bias of said spring.

5. A projection TV system as recited in claim 2 wherein said lens is provided with an external focus adjustment for moving said at least one lens element and said means for adjusting the focus is attached to said external focus adjustment for movement thereof.

6. A projection TV system as recited in claim 5 wherein said means for adjusting the focus is a bimetal leaf which deflects with increasing ambient temperature.

7. A projection TV system as recited in claim 2 wherein said at least one movable lens element is axially movable and said means for adjusting the focus comprises a piston slidable in a cylinder, said cylinder being filled with a material that expands with temperature and acts against said piston to cause said piston to move within said cylinder, and a coupling between said movable lens element and said piston, said coupling translating the motion of said piston to said movable lens element to cause axial movement thereof.

8. A projection TV system as recited in claim 5 wherein said means for adjusting the focus comprises a piston slidable in a cylinder, said cylinder being filled with a material that expands with temperature and acts against said piston to cause said piston to move within said cylinder, and a coupling between said external focus adjustment and said piston, said coupling translating the motion of said piston to said external focus adjustment to cause movement thereof.

9. A projection TV system as recited in claims 7 or 8 wherein said material is a polyethylene glycol.

10. In a projection TV system of the type comprising three lens and CRT assemblies arranged to separately project red, blue and green images onto a screen for viewing, a lens housing for each lens of said assemblies, each lens having a plurality of lens elements at leas one of which is movable by means of an external focus adjustment projecting through the lens housing in order to focus one of said images on said screen, the focus of each lens varying with ambient temperature around the lens as the temperature increases from turn-on of the projection TV system to a warmed-up condition of said system, the improvement comprising for each said lens:
- an integral cylinder and housing fixedly attached to said lens housing and filled with a material that expands with temperature,
- a piston slidable in said cylinder, said material acting against said piston to cause said piston to move within said cylinder, and
- a direct connection between said piston and said external focus adjustment, the movement of said piston causing the focus of the projected image to be adjusted as a function of said ambient temperature.

* * * * *